(12) United States Patent (10) Patent No.: US 12,689,258 B1
Ekins et al. (45) Date of Patent: Jul. 21, 2026

(54) MOTOR HOUSING ASSEMBLY CONNECTIONS USING RADIALLY DISPOSED ANTI-ROTATION FASTENERS IN WELL SYSTEMS

(71) Applicant: Halliburton Energy Services, Inc., Houston, TX (US)

(72) Inventors: Philip Ekins, Frimley (GB); Michael Rimmer, Frimley (GB); Hassan Mansir, Frimley (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 19/033,711

(22) Filed: Jan. 22, 2025

(51) Int. Cl.
  *E21B 43/12* (2006.01)
  *H02K 5/132* (2006.01)
(52) U.S. Cl.
  CPC ........... *H02K 5/132* (2013.01); *E21B 43/128* (2013.01)
(58) Field of Classification Search
  CPC ................................................... E21B 43/128
  See application file for complete search history.

(56) References Cited

U.S. PATENT DOCUMENTS

| | | | | |
|---|---|---|---|---|
| 4,452,472 | A | 6/1984 | Crase | |
| 4,665,978 | A * | 5/1987 | Luke ....................... | E21B 36/00 277/340 |
| 4,913,229 | A | 4/1990 | Hearn | |
| 6,318,470 | B1 * | 11/2001 | Chang ................. | E21B 23/0413 175/62 |
| 7,146,704 | B2 | 12/2006 | Otten et al. | |
| 10,648,243 | B1 * | 5/2020 | Burrows ............... | E21B 17/046 |
| 10,760,377 | B1 * | 9/2020 | Hegarty ............... | E21B 34/102 |
| 2005/0258640 | A1 * | 11/2005 | Otten ...................... | F16L 15/08 285/333 |
| 2009/0304526 | A1 * | 12/2009 | Ford ..................... | E21B 43/121 210/171 |
| 2012/0318495 | A1 * | 12/2012 | Crow ................... | E21B 34/066 166/242.6 |

(Continued)

FOREIGN PATENT DOCUMENTS

| | | |
|---|---|---|
| CN | 217558728 | 10/2022 |
| EP | 1261801 | 1/2007 |

OTHER PUBLICATIONS

"PCT Application No. PCT/US2025/016158 International Search Report and Written Opinion", Oct. 13, 2025, 9 pages.

*Primary Examiner* — David Carroll
(74) *Attorney, Agent, or Firm* — DeLizio, Peacock, Lewin & Guerra LLP

(57) ABSTRACT

Systems, methods, and apparatus for implementing a downhole motor assembly in a well system. The downhole motor assembly may include a first tubular housing configured to house a first portion of the downhole motor assembly, and a second tubular housing configured to house a second portion of the downhole motor assembly. The second tubular housing may be configured to axially join with the first tubular housing. One or more radially disposed fasteners may be coupled with the first tubular housing and the second tubular housing. The one or more radially disposed fasteners may be configured to secure a joint between the first tubular housing and the second tubular housing. Each of the one or more radially disposed fasteners may include a threaded portion and a cylindrical portion.

20 Claims, 10 Drawing Sheets

(56) References Cited

U.S. PATENT DOCUMENTS

| | | | |
|---|---|---|---|
| 2013/0340245 A1* | 12/2013 | Watson | F04D 13/08 |
| | | | 29/592.1 |
| 2014/0227028 A1 | 8/2014 | Wu et al. | |
| 2016/0102535 A1* | 4/2016 | Wang | F04B 17/03 |
| | | | 417/417 |
| 2017/0074083 A1* | 3/2017 | Morton, III | E21B 43/38 |
| 2017/0204904 A1* | 7/2017 | Parmeter | E21B 43/128 |
| 2019/0010782 A1* | 1/2019 | Parkins | E21B 34/08 |
| 2020/0165877 A1* | 5/2020 | Moore | E21B 10/22 |
| 2024/0287996 A1* | 8/2024 | Rimmer | F04D 29/086 |

* cited by examiner

700

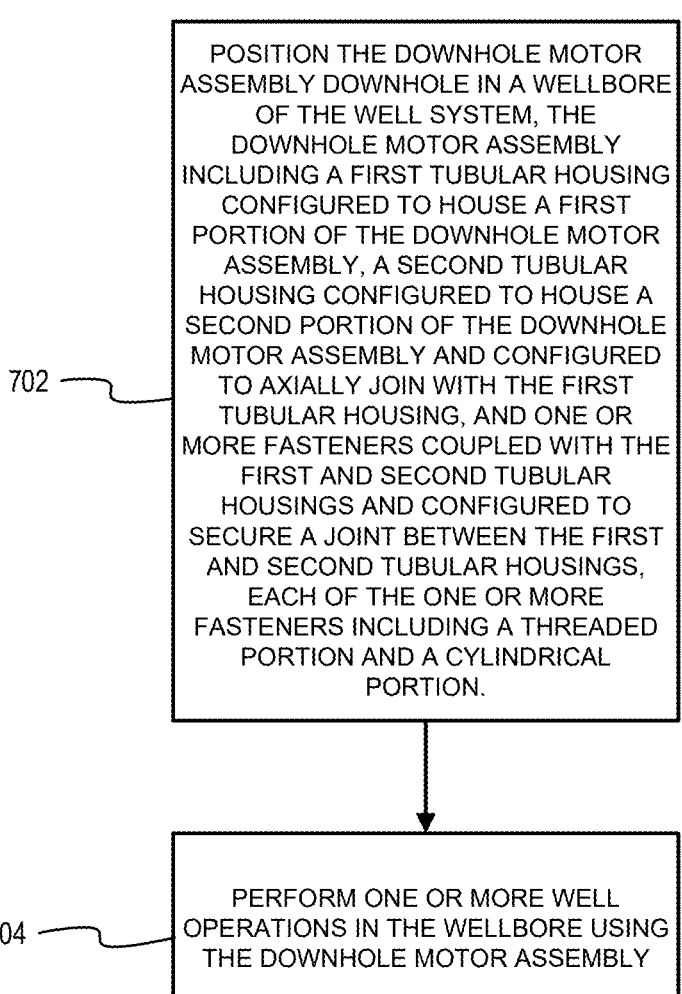

702 —

POSITION THE DOWNHOLE MOTOR ASSEMBLY DOWNHOLE IN A WELLBORE OF THE WELL SYSTEM, THE DOWNHOLE MOTOR ASSEMBLY INCLUDING A FIRST TUBULAR HOUSING CONFIGURED TO HOUSE A FIRST PORTION OF THE DOWNHOLE MOTOR ASSEMBLY, A SECOND TUBULAR HOUSING CONFIGURED TO HOUSE A SECOND PORTION OF THE DOWNHOLE MOTOR ASSEMBLY AND CONFIGURED TO AXIALLY JOIN WITH THE FIRST TUBULAR HOUSING, AND ONE OR MORE FASTENERS COUPLED WITH THE FIRST AND SECOND TUBULAR HOUSINGS AND CONFIGURED TO SECURE A JOINT BETWEEN THE FIRST AND SECOND TUBULAR HOUSINGS, EACH OF THE ONE OR MORE FASTENERS INCLUDING A THREADED PORTION AND A CYLINDRICAL PORTION.

704 —

PERFORM ONE OR MORE WELL OPERATIONS IN THE WELLBORE USING THE DOWNHOLE MOTOR ASSEMBLY

FIG. 7

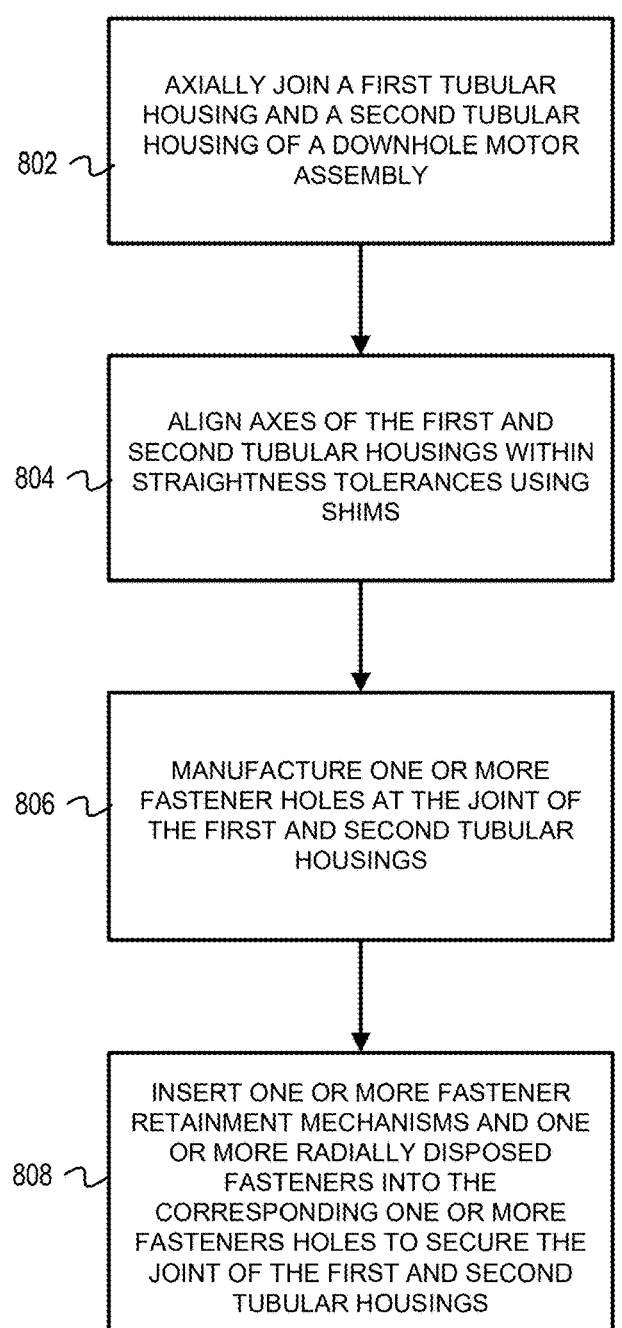

800

802 — AXIALLY JOIN A FIRST TUBULAR HOUSING AND A SECOND TUBULAR HOUSING OF A DOWNHOLE MOTOR ASSEMBLY

804 — ALIGN AXES OF THE FIRST AND SECOND TUBULAR HOUSINGS WITHIN STRAIGHTNESS TOLERANCES USING SHIMS

806 — MANUFACTURE ONE OR MORE FASTENER HOLES AT THE JOINT OF THE FIRST AND SECOND TUBULAR HOUSINGS

808 — INSERT ONE OR MORE FASTENER RETAINMENT MECHANISMS AND ONE OR MORE RADIALLY DISPOSED FASTENERS INTO THE CORRESPONDING ONE OR MORE FASTENERS HOLES TO SECURE THE JOINT OF THE FIRST AND SECOND TUBULAR HOUSINGS

FIG. 8

MOTOR HOUSING ASSEMBLY CONNECTIONS USING RADIALLY DISPOSED ANTI-ROTATION FASTENERS IN WELL SYSTEMS

TECHNICAL FIELD

The present invention relates generally to oil and gas systems and services, and more specifically to motor housing assembly connections using radially disposed anti-rotation fasteners in well systems.

BACKGROUND

The oil and gas services industry uses various types of well equipment and tools in well systems at well sites. Well systems may use electric submersible pump (ESP) systems that includes surface equipment, well tubing, and a downhole ESP motor assembly. The downhole ESP motor assembly is typically constructed from several thin-walled tubular housing sections because the radial space within the tubular housing is limited and used to house various sections and components of the ESP motor assembly. The thin walls and limited space may limit the mechanisms that are used to join the multiple tubular housing sections of the ESP motor assembly. For example, bolted flanges, large diameter threads, and external collars may utilize too much radial space to be used to join the multiple tubular housing sections of the ESP motor assembly. In some ESP motor assemblies, housing sections with threaded joints or welding of the housing sections may be used. However, threaded housings and welding may place constraints on the functional design of the machinery and limit its capability. For example, a threaded joint does not allow the housing sections to be assembled without rotation, and components of the ESP motor assembly that need to fit together may not allow assembly by rotation. Also, the amount of heat generated during a welding process and with any post-welding heat treatments may affect internal components of the ESP motor assembly and introduce unwanted deformation, which can affect the straightness of the ESP motor assembly and impact the performance and reliability of the ESP motor assembly.

BRIEF DESCRIPTION OF THE DRAWINGS

FIG. 7 is a flowchart of example operations for using a downhole motor assembly in a well system, according to some implementations.

FIG. 8 is a flowchart of example operations for joining the tubular housings of the downhole motor assembly, according to some implementations.

DESCRIPTION

The description that follows includes example systems, methods, techniques, and program flows that describe aspects of the disclosure. However, it is understood that this disclosure may be practiced without these specific details. For instance, this disclosure refers to certain well systems, devices, or tools in illustrative examples. Aspects of this disclosure can be instead applied to other types of well systems, devices, and tools. In other instances, well-known instruction instances, protocols, structures, and techniques have not been shown in detail to avoid confusion.

Figure 1:
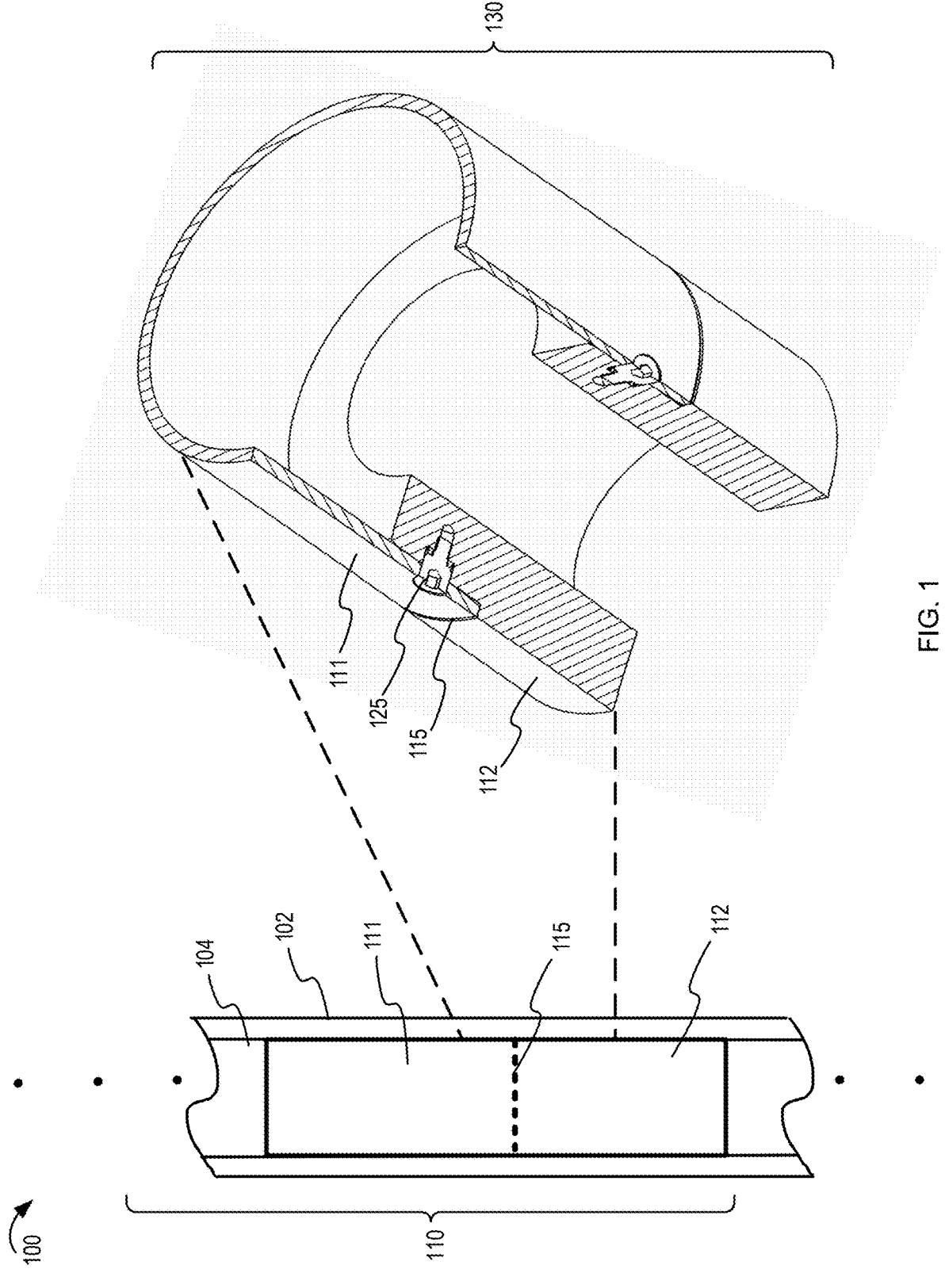
FIG. 1 depicts a schematic diagram of an example motor housing assembly with radially disposed fasteners for well systems, according to some implementations.

FIG. 1 depicts a schematic diagram of an example motor housing assembly with radially disposed fasteners for well systems, according to some implementations. In some implementations, a well system 100 may include a wellbore 102, well tubing 104 (e.g., a work string or other type of well tubing), surface equipment and tools (not shown), and downhole equipment and tools, such as the downhole motor assembly 110. In some implementations, the downhole motor assembly 110 may be an electric submersible pump (ESP) motor assembly or other types of motor assemblies that are used in well systems. FIG. 1 shows a portion of downhole motor assembly 110, the wellbore 102 and well system 100 for simplicity. It is noted that the well system 100 may include additional downhole and surface devices, tools and other components that are not shown for simplicity. An example well system having a downhole motor assembly is further described in FIG. 8. The well system 100 may use the downhole motor assembly 110, such as an ESP motor assembly, for performing well operations and functions, such as producing fluids (e.g. oil and gas) from downhole to the surface by creating a differential pressure that forces the fluid upward through the wellbore and monitoring downhole well conditions (such as pressure and temperature), among others.

The downhole motor assembly 110 may be formed from multiple tubular sections, components or parts that are joined together (e.g., as shown in FIG. 8). In some implementations, one or more custom fasteners and securing techniques may be used to join two or more of the tubular sections. In some implementations, a first tubular housing 111 and a second tubular housing 112 of the downhole motor assembly 110 may be joined together at the joint 115 using one or more custom fasteners and one or more securing techniques. The first tubular housing 111 may house a first section or a first portion of the downhole motor assembly 110, and the second tubular housing 112 may house a second section or a second portion of the downhole motor assembly 110. For example, the first tubular housing 111 may be the outer housing of the downhole motor assembly 110, and the second tubular housing 112 may be the end housing of the downhole motor assembly 110. As shown in the cross-sectional view 130 of the joined tubular housings 111 and 112, the joint 115 may be secured by at least one radially disposed fastener 125 (e.g., such as a custom shoulder bolt) and other securing mechanisms (e.g., such as a fastener retainment mechanism), as further described below. The radially disposed fastener(s) may also be referred to as the fastener(s) 125. For example, multiple fasteners 125 may be radially disposed around the circumference of the joint 115 of the joined tubular housings 111 and 112. During assembly and/or manufacture, the first tubular housing 111 and the second tubular housing 112 may be axially joined as shown in FIG. 1. For example, a portion of the second tubular housing 112 can be inserted axially into position within a portion of the first tubular housing 111. In some implementations, after the tubular housings 111 and 112 are joined, one or more fastener holes are radially milled that correspond to the one or more radially disposed fasteners 125 that are used to secure the joined tubular housings 111 and 112. This provides an accurate alignment of motor assembly features and components, and allows for the adjustment of straightness of the tubular components of the motor assembly. It is noted, however, that in other implementations, where machining accuracy and application permit, the fastener holes may be pre-milled into each of the tubular housings 111 and 112 prior to assembly and/or manufacture. In some implementations, one or more of the fasteners 125 can be radially inserted into the milled fastener holes to secure the joined tubular housings 111 and 112. In some implementations, one or more fastener retainment mechanisms and one or more corresponding fasteners 125 can be inserted into the milled fastener holes to secure the joined tubular housings 111 and 112, as further described below in FIGS. 2A-2C. Since the one or more fasteners 125 interface with both the first and second tubular housings 111 and 112, a single shear plane may be provided to constrain the axial and rotational position of the first and second tubular housings 111 and 112. The radial translation of the first and second tubular housings 111 and 112 may be constrained by the housing geometry. Although not shown in FIG. 1, the joints between additional adjacent housings of the downhole motor assembly 110 can be similarly joined and secured together, e.g., a third tubular housing and a fourth tubular housing can be similarly joined and secured together, etc.

Figure 2A:
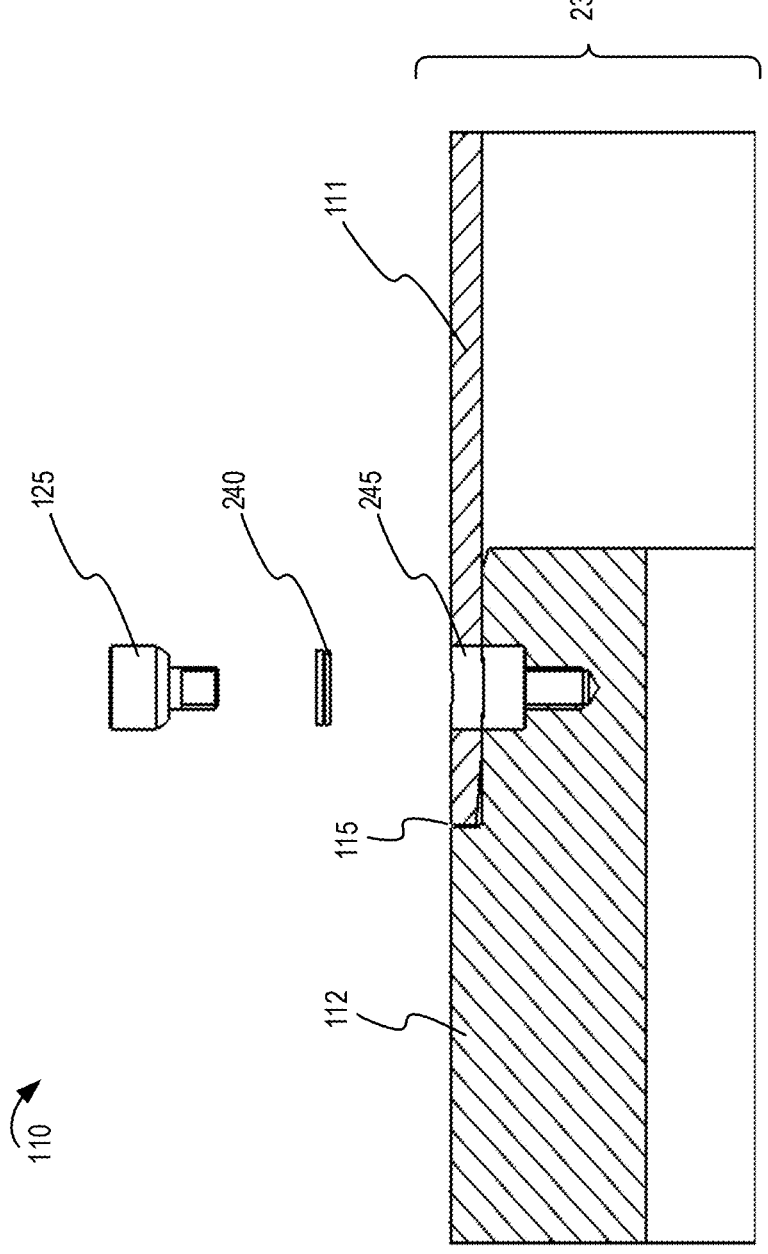
FIG. 2A depicts a schematic diagram of an example attachment and securing mechanism of the first tubular housing and the second tubular housing of the downhole motor assembly, according to some implementations.

FIG. 2A depicts a schematic diagram of an example attachment and securing mechanism of the first tubular housing 111 and the second tubular housing 112 of the downhole motor assembly 110, according to some implementations. FIG. 2A shows an axial cross-sectional view 230 of the joint 115 of the first and second tubular housings 111 and 112. In some implementations, after axially joining the tubular housings 111 and 112 (e.g., during manufacture and/or assembly), the fastener retainment mechanism 240 can be added to the fastener hole 245. For example, the fastener retainment mechanism 240 can be inserted into the fastener hole 245. The fastener retainment mechanism 240 may be configured to retain the radially disposed fastener 125 in place, for example, by resisting vibrational dismantlement. In some implementations, the fastener retainment mechanism 240 may be a lock washer. For example, the lock washer can be inserted into the fastener hole 245 and may act between the bottom face of the fastener 125 (e.g., the bottom face of a shoulder bolt) and the fastener hole 245. It is noted, however, that in other implementations the fastener retainment mechanism can be a thread-locking compound, a residual-torque thread profile, or a residual-torque thread insert. After adding the fastener retainment mechanism 240, the fastener 125 can be radially inserted and tightened to secure the joint 115 of the first tubular housing 111 and the second tubular housing 112. For example, the fastener 125 can secure the joint 115 by constraining the axial and rotational movements of the tubular housings 111 and 112. The fastener 125 is described further below in FIG. 2C. Although not shown in FIG. 2A, two or more radially disposed fasteners 125, two or more corresponding fastener retainment mechanisms 240, and two or more corresponding fastener holes 245 may be used to secure the joint 115. For example, as shown in the radial cross-sectional view 231 of FIG. 2B, the joint 115 of the first tubular housing 111 and the second tubular housing 112 of the downhole motor assembly 110 may be secured by four radially disposed fasteners 125 and four corresponding fastener retainment mechanisms and fastener holes. In some implementations, the angular spacings between the fasteners 125 can be the same or approximately the same. It is noted, however, that in some implementations, the angular spacings between the fasteners 125 need not to be even. For example, the fasteners may not be evenly spaced to avoid underlying housing features, such as electrical connectors, fluid passages, etc.

Figures 2B, 2C:
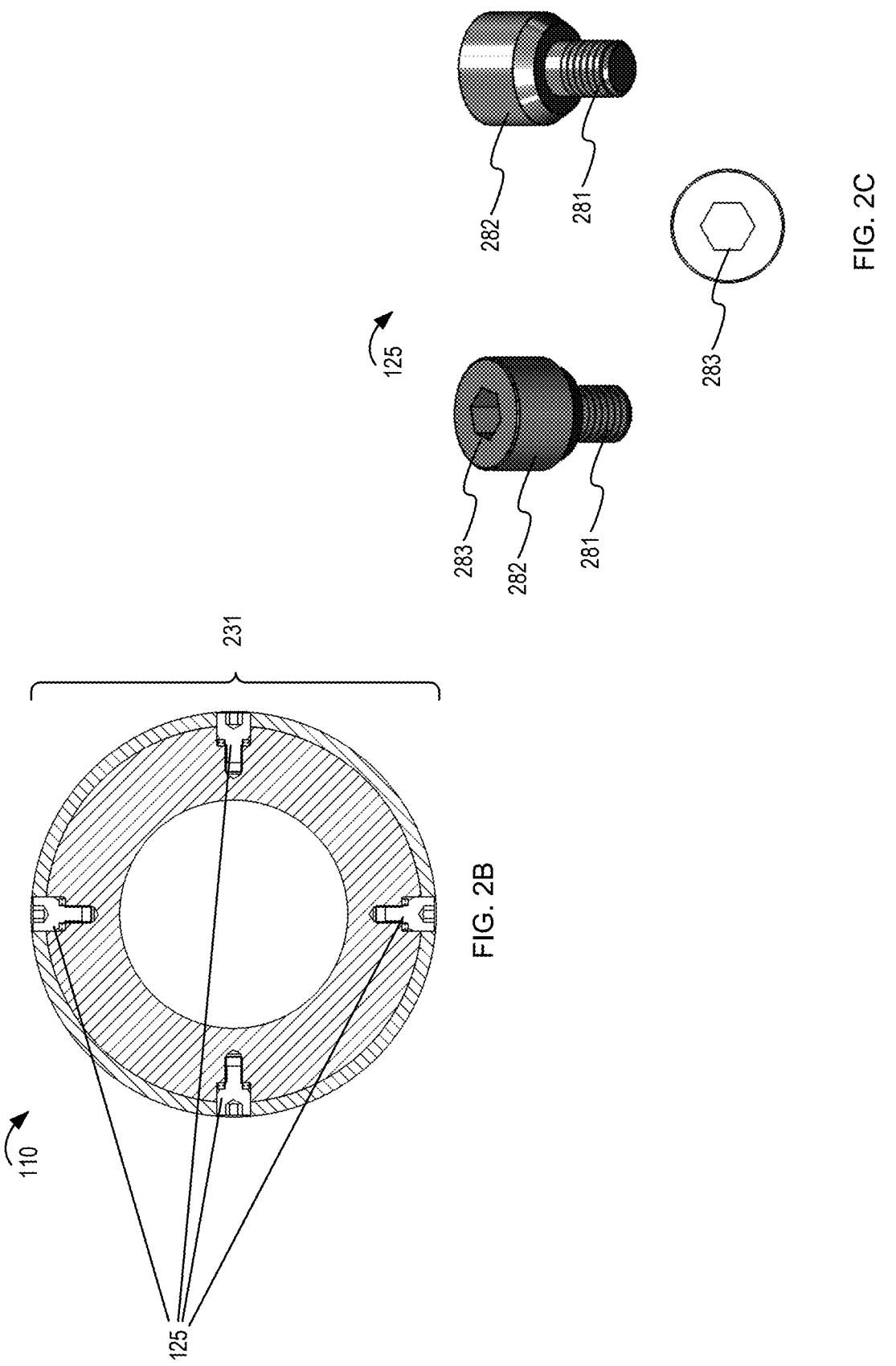
FIG. 2B depicts a schematic diagram of another example attachment and securing mechanism of the first tubular housing and the second tubular housing of the downhole motor assembly, according to some implementations.
FIG. 2C depicts a schematic diagram of an example fastener for securing the joint of the first tubular housing and the second tubular housing of the downhole motor assembly, according to some implementations.

FIG. 2C depicts a schematic diagram of an example fastener 125 for securing the joint 115 of the first tubular housing 111 and the second tubular housing 112 of the downhole motor assembly 110, according to some implementations. As described above, one or more radially disposed fasteners 125 may be used to secure the joint 115 of the first tubular housing 111 and the second tubular housing 112. As shown in FIG. 2C, the fastener 125 may include a threaded portion 281, a cylindrical portion 282, and a drive feature 283. In some implementations, the one or more fasteners 125 may be custom shoulder bolts or other types of fasteners having the threaded portion 281, the cylindrical portion 282, and the drive feature 283. In some implementations, the threaded portion 281 may be located at the bottom of the fastener 125, and may serve as the attachment and securing mechanism. The milled fastener hole may similarly have the threaded portion (e.g., a female threaded portion) at the bottom of the milled fastener hole such that the fastener 125 can be inserted into the milled fastener hole. It is noted, however, that in other implementations the threaded portion may be located anywhere on the fastener 125, such as at the top or head of the fastener 125, e.g., as described below in FIGS. 6A-6B. The threaded portion 281 may connect to one or both of the first tubular housing 111 and the second tubular housing 112. In some implementations, the cylindrical portion 282 may have a shoulder for the fastener 125, and thus may be referred to as a cylindrical shoulder portion of the fastener 125 (e.g., a cylindrical should portion of the shoulder bolt). The milled fastener hole may have a smaller diameter threaded portion (e.g., a female threaded portion that receives the male threaded portion 281 of the fastener 125) and a larger diameter cylindrical portion that receives the cylindrical shoulder portion of the fastener 125. It is noted, however, that in other implementations, the shoulder feature of the fastener 125 may be part of the threaded portion, such as the fastener shown in FIGS. 6A-6B. In some implementations, the drive feature 283 may be a hexagonal drive socket, as shown in FIG. 2C. It is noted, however, that the drive feature 283 may be any other type of drive type, such as Torx, square, polygonal, oval, or security versions of the same, among others. The drive feature 283 allows the fastener 125 to be properly tightened and removed, even when the fastener retainment mechanism is used for the fastener 125. The joint 115 between the first and second tubular housings 111 and 112 can be opened by using the drive feature 283 to loosen (e.g., by overcoming the effects of the fastener retainment mechanism) and removing the one or more fasteners 125.

In some implementations, the first and second tubular housings 111 and 112 may have relatively thin walls. Thin housing walls and limited internal space may limit the mechanisms that are used to join the multiple tubular housing sections of the downhole motor assembly 110. The radially disposed fasteners 125 and the securing mechanisms and techniques described herein can secure the joint 115 of the first and second tubular housings 111 and 112 when the downhole motor assembly 110 has thin-walled housings.

Figure 3:
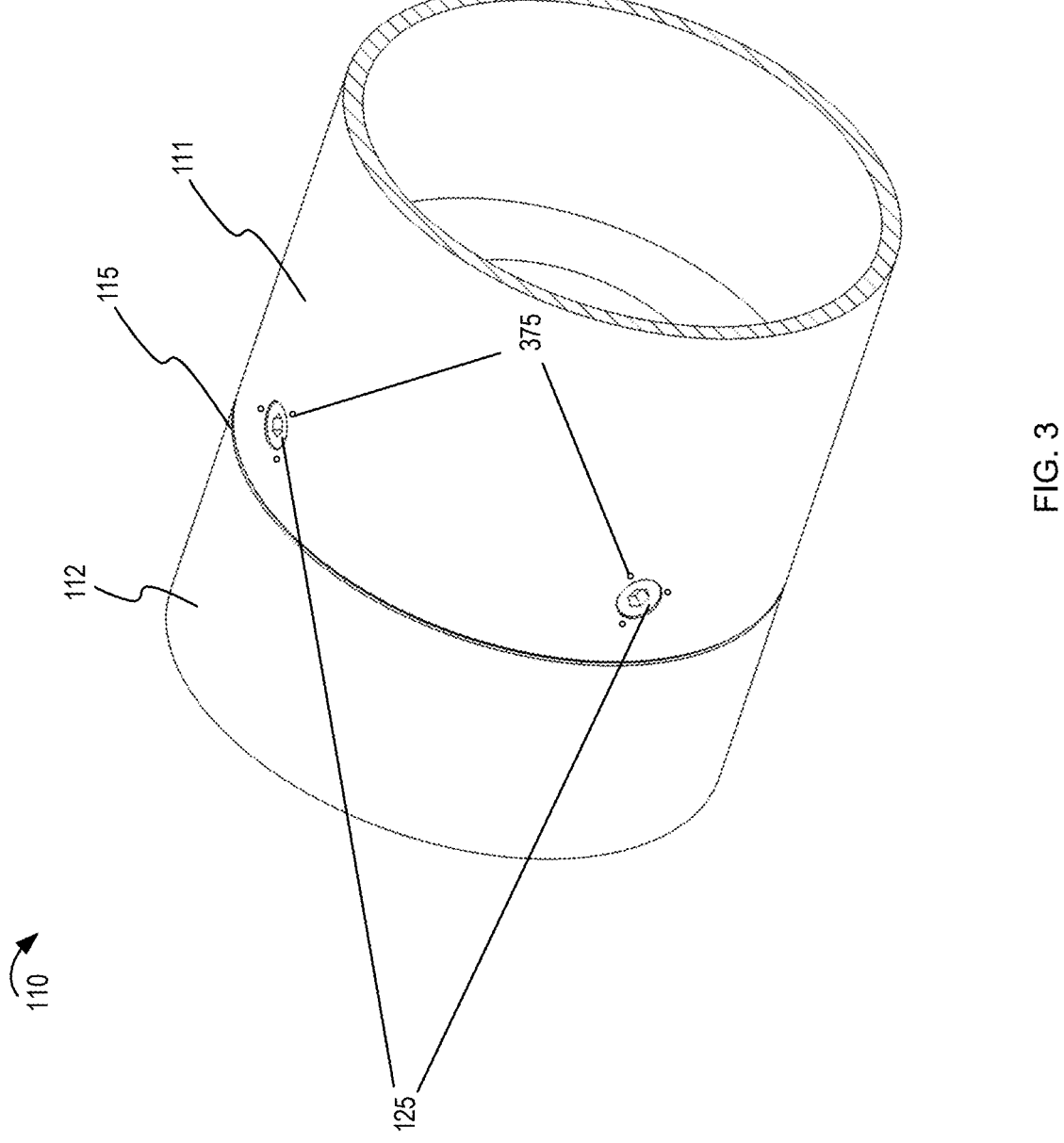
FIG. 3 depicts a schematic diagram of an example joint of the first tubular housing and the second tubular housing of the downhole motor assembly including radially disposed fasteners and peening, according to some implementations.

FIG. 3 depicts a schematic diagram of an example joint 115 of the first tubular housing 111 and the second tubular housing 112 of the downhole motor assembly 110 including radially disposed fasteners and peening, according to some implementations. As described above, the joint 115 of the first and second tubular housings 111 and 112 may be joined and secured by the radially disposed fasteners 125 and the fastener retainment mechanisms (not shown). Furthermore, in some implementations, to supplement resistance to vibration-induced dismantlement during operation of the downhole motor assembly 110, physical swaging or peening 375 of the housing material or the fasteners 125 can be applied. For example, the peening 375 can be applied to the area of the housing that surrounds the fasteners 125 or to the fasteners 125 or both. When the housing sections of the downhole motor assembly 110 are assembled as described above in FIGS. 1-3, the joint 115 may be constrained from axial displacement (e.g., acting against internal pressure forces and external flexure), may resist relative rotational displacement (e.g., torque), and has a low likelihood of loosening due to vibration.

Figure 4:
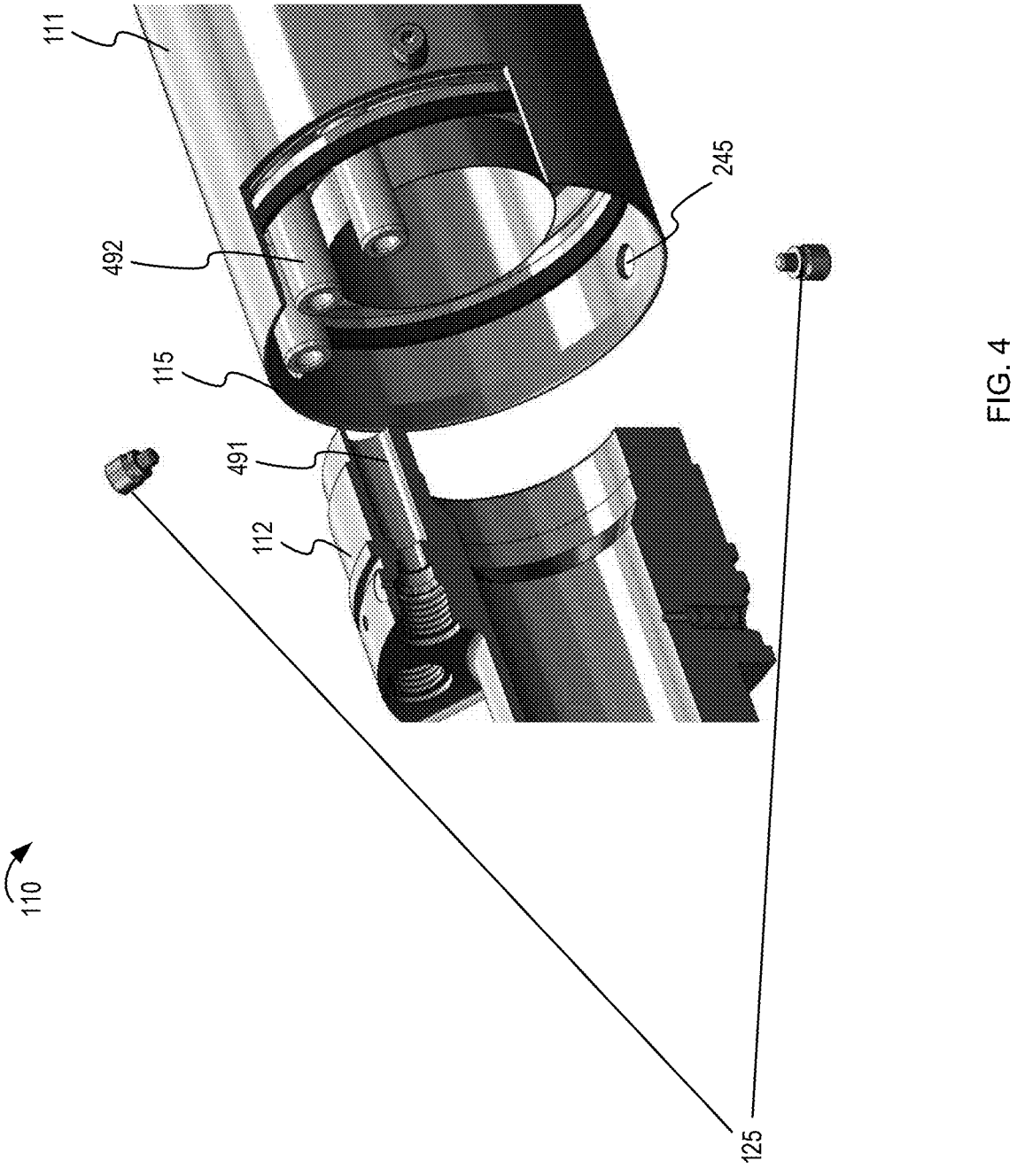
FIG. 4 depicts a schematic diagram of an example motor housing joint having motor assembly features for axial attachment, according to some implementations.

FIG. 4 depicts a schematic diagram of an example motor housing joint having motor assembly features for axial attachment, according to some implementations. In some implementations, the first tubular housing 111 and the second tubular housing 112 may include features and components of the downhole motor assembly 110 that are connected or joined axially when joining the first and second tubular housings 111 and 112. For example, the first tubular housing 111 may include electrical connection sockets 491 that are positioned to be axially connected or joined with machined features 492 of the second tubular housing 112. When the second tubular housing 112 is inserted axially into position and joined with the first tubular housing 111 (and also any additional adjacent housings are similarly joined), the internal features and components of the housings 111 and 112 are connected and joined to form the different sections of the downhole motor assembly 110. Furthermore, after axially joining the housings 111 and 112, the one or more fastener holes 245 may be milled, one or more fastener retainment mechanisms may be applied, and one or more radially disposed fasteners 125 may be inserted to secure the joint 115 of the housings 111 and 112 (as described in FIGS. 1-2C). By securing the joint 115 using the fasteners 125, the internal components (e.g., electrical connections) of the downhole motor assembly 110 can be securely connected and any motor assembly seals can be securely maintained. Also, the area surrounding the one or more fasteners 125 and fastener holes 245 may be peened (as described in FIG. 3).

Figure 5:
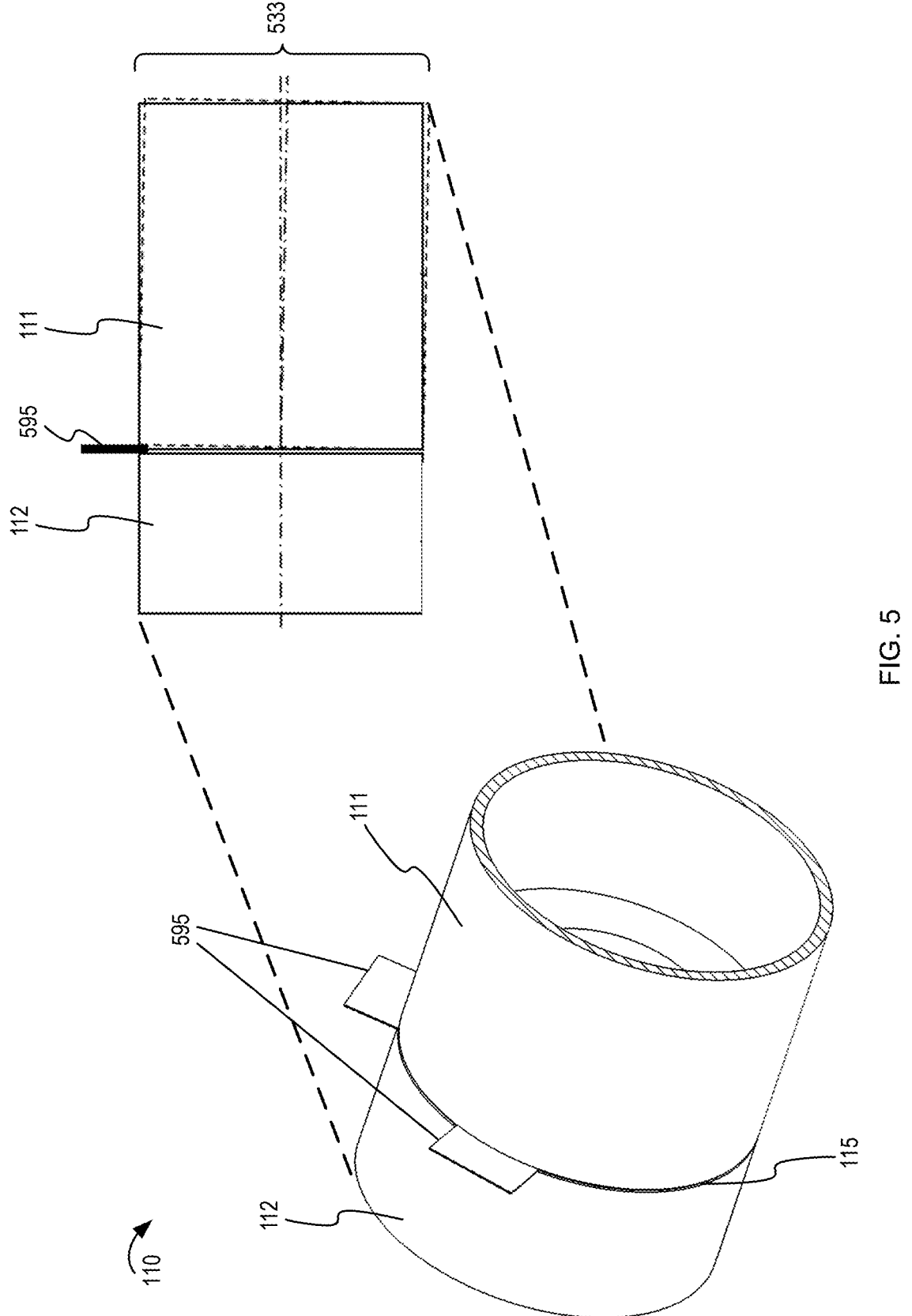
FIG. 5 depicts a schematic diagram of an example axis alignment technique for the motor assembly housing joint, according to some implementations.

FIG. 5 depicts a schematic diagram of an example axis alignment technique for the motor assembly housing joint, according to some implementations. In some implementations, if the axis alignment of the first tubular housing 111 and the second tubular housing 112 does not fall within straightness tolerances when fully assembled, one or more shims 595 can be applied to improve the straightness of the downhole motor assembly 110. For example, as shown in the axial cross-sectional view 533, the shims 595 may be introduced to fill one side of the housings' mating faces which, when the housings contact, adjusts the alignment to improve the straightness of the housings 111 and 112. The thickness of the shims 595 and the position of the shims 595 around the circumference of the joint 115 of the housings 111 and 112 can bias the housings' alignment when the joint 115 is fully compressed axially in order to bring the axis alignment within the straightness tolerances. After applying the shims 595, the fasteners and joining techniques described above can be applied to secure the joint 115 and the housings 111 and 112 in place. Then, the shims 595 can be removed and any excess material can be trimmed.

Figures 6A, 6B:
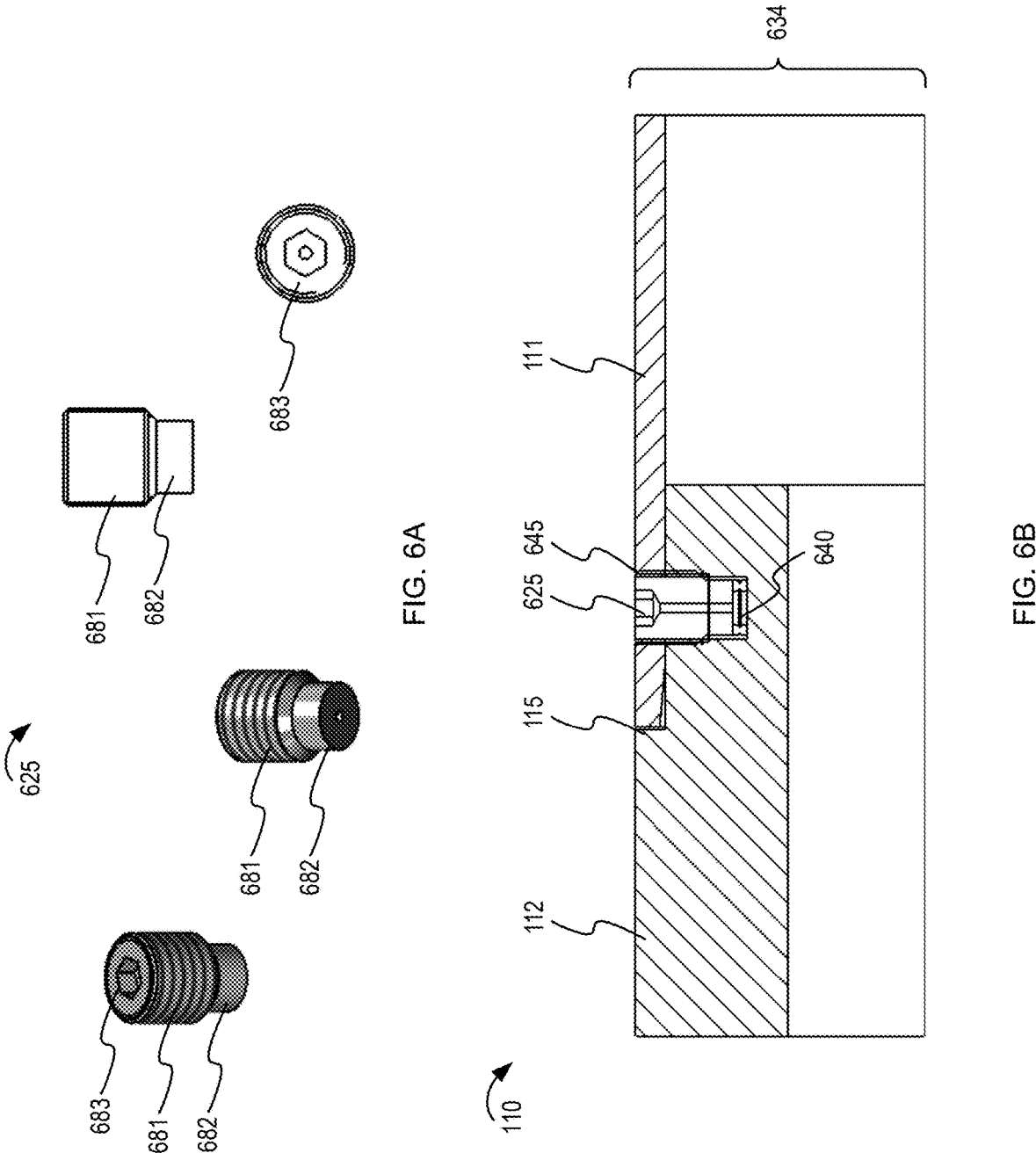
FIG. 6A depicts a schematic diagram of another example fastener for securing the joint of the first tubular housing and the second tubular housing of the downhole motor assembly, according to some implementations.
FIG. 6B depicts a schematic diagram of another example attachment and securing mechanism of the first tubular housing and the second tubular housing of the downhole motor assembly, according to some implementations.

FIG. 6A depicts a schematic diagram of another example fastener 625 for securing the joint 115 of the first tubular housing 111 and the second tubular housing 112 of the downhole motor assembly 110, according to some implementations. In some implementations, one or more radially disposed fasteners 625 may be used to secure the joint 115 of the first tubular housing 111 and the second tubular housing 112. The radially disposed fastener(s) may also be referred to as the fastener(s) 625. For example, multiple fasteners 625 may be radially disposed around the circumference of the joint 115 of the joined tubular housings 111 and 112. As shown in FIG. 6A, the fastener 625 may include a threaded portion 681, a cylindrical portion 682, and a drive feature 683. Compared to the fastener 125 shown in FIG. 2C, the threaded portion 681 of the fastener 625 may be located at the top of the fastener 625 (instead of at the bottom of the fastener 125 of FIG. 2C), and the cylindrical portion 682 of the fastener 625 may be located at the bottom of the fastener 625 (instead of at the top of the fastener 125 of FIG. 2C). In some implementations, one or more radially disposed fasteners 625 may be used to secure the joint 115 of the first tubular housing 111 and the second tubular housing 112. The one or more fasteners 625 may be custom shoulder bolts or other types of fasteners having the threaded portion 681, the cylindrical portion 682, and the drive feature 683. The milled fastener hole may similarly have the threaded portion (e.g., a female threaded portion) at the top of the milled fastener hole such that the fastener 625 can be inserted into the milled fastener hole. The female threaded portion of the fastener hole may be located in the first tubular housing 111 or in both the first and second tubular housings 111 and 112. It is noted, however, that in other implementations the threaded portion and the cylindrical portion may be located anywhere on the fastener 625 (e.g., fastener 125 of FIG. 2C). The threaded portion 681 may connect to one or both of the first tubular housing 111 and the second tubular housing 112. In some implementations, the threaded portion 681 may have a shoulder for the fastener 625, and thus may be referred to as a threaded shoulder portion of the fastener 625 (e.g., a threaded shoulder portion of the shoulder bolt). The milled fastener hole may have a larger diameter threaded portion (e.g., a female threaded portion that receives the male threaded portion 681 of the fastener 625) and a smaller diameter cylindrical portion that receives the cylindrical portion 682 of the fastener 625. It is noted, however, that in other implementations, the shoulder feature of the fastener may be part of the cylindrical portion, such as the fastener 125 shown in FIG. 2C. In some implementations, the drive feature 683 may be a hexagonal drive socket, as shown in FIG. 6A. It is noted, however, that the drive feature 683 may be any other type of drive type, such as Torx, square, polygonal, oval, or security versions of the same, among others. The drive feature 683 allows the fastener 625 to be properly tightened and removed, even when the fastener retainment mechanism is used for the fastener 625.

FIG. 6B depicts a schematic diagram of another example attachment and securing mechanism of the first tubular housing and the second tubular housing of the downhole motor assembly, according to some implementations. As shown in the axial cross-sectional view 634 of the joined tubular housings 111 and 112, the joint 115 may be secured by at least one radially disposed fastener 625 (e.g., such as a custom shoulder bolt) and other securing mechanisms, such as a fastener retainment mechanism 640. In some implementations, after axially joining the tubular housings 111 and 112 (e.g., during manufacture and/or assembly), the fastener retainment mechanism 640 can be added to the fastener hole 645. For example, the fastener retainment mechanism 640 can be inserted into the fastener hole 645. The fastener retainment mechanism 640 may be configured to retain the fastener 625 in place, for example, by resisting vibrational dismantlement. In some implementations, the fastener retainment mechanism 640 may be a lock washer. It is noted, however, that in other implementations the fastener retainment mechanism can be a thread-locking compound, a residual-torque thread profile, or a residual-torque thread insert. After adding the fastener retainment mechanism 640, the fastener 625 can be inserted and tightened to secure the joint 115 of the first tubular housing 111 and the second tubular housing 112. For example, the fastener 625 can secure the joint 115 by constraining the axial and rotational movements of the tubular housings 111 and 112. Although not shown in FIG. 6B, two or more radially disposed fastener 625, two or more corresponding fastener retainment mechanisms 640, and two or more corresponding fastener holes 645 may be used to secure the joint 115. Although not shown in FIG. 6B, the joints between additional adjacent housings of the downhole motor assembly 110 can be similarly joined and secured together, e.g., a third tubular housing and a fourth tubular housing can be similarly joined and secured together, etc.

It is noted that the fasteners and attachment and securing mechanisms described above in FIGS. 1-6B permits assembly of thin-walled housing sections without rotation, without welding and without bulky and costly attachment mechanisms, maintains the housings' positional relationship, allow the assembly to be practicably recoverable in case of machine break-down, and allow the easy disassembly of the housing sections without damage to the housing. The fasteners and attachment and securing mechanisms described above in FIGS. 1-6B secure the joint of two housing sections by resisting axial movement caused by internal pressure variations or external forces, resists device-induced and externally subjected torque between housings, resists externally subjected flexure between housings, and reduces susceptibility to vibration induced dismantlement. The mechanisms described herein also provides an engineered method of achieving the shear, flexure, and torque specifications without reliance on operator variability.

FIG. 7 is a flowchart 700 of example operations for using a downhole motor assembly in a well system, according to some implementations. In some implementations, the downhole motor assembly may be positioned downhole in a wellbore of the well system. The downhole motor assembly may include a first tubular housing configured to house a first portion of the downhole motor assembly, a second tubular housing configured to house a second portion of the downhole motor assembly and configured to axially join with the first tubular housing, and one or more radially disposed fasteners coupled with the first tubular housing and the second tubular housing and configured to secure a joint between the first tubular housing and the second tubular housing. Each of the one or more radially disposed fasteners may include a threaded portion and a cylindrical portion (block 702). In some implementations, one or more well operations are performed in the wellbore using the downhole motor assembly (block 704).

FIG. 8 is a flowchart 800 of example operations for joining the tubular housings of the downhole motor assembly, according to some implementations. In some implementations, during manufacturing and/or assembly, a first tubular housing and a second tubular housing of the downhole motor assembly may be axially joined (block 802). For example, a portion of the second tubular housing can be inserted axially into position within a portion of the first tubular housing. In some implementations, after the tubular housings are joined, one or more shims can be used to align axes of the first and second tubular housings within straightness tolerances (block 804). In some implementations, after improving the axis alignment of the tubular housings, one or more fastener holes can be radially milled (or otherwise manufactured) at the joint of the first and second tubular housings (block 806). In some implementations, one or more fastener retainment mechanisms and one or more radially disposed fasteners can be inserted into the corresponding one or more fastener holes to secure the joint of the first and second tubular housings (block 808).

Figure 9:
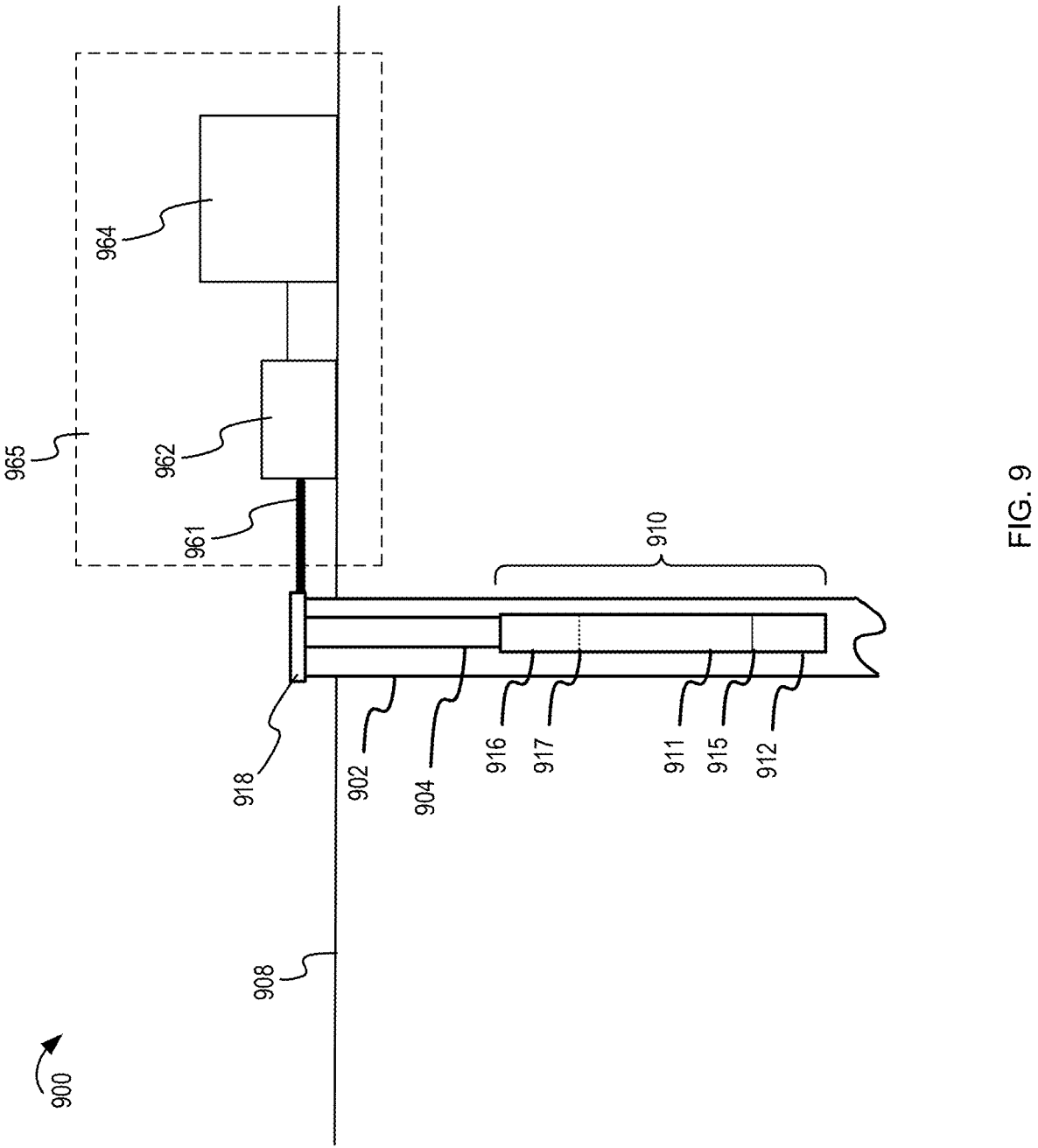
FIG. 9 is a schematic diagram of an example well system that includes a downhole motor assembly, according to some implementations.

FIG. 9 is a schematic diagram of an example well system 900 that includes a downhole motor assembly 910, according to some implementations. The well system 900 may include a wellbore 902, well tubing 904, the downhole motor assembly 910, and surface equipment 965. It is noted that additional equipment, tools and devices of the well system 900 are not shown for simplicity. In some implementations, the surface equipment 965 located at the surface 908 may include a junction box 962, a control panel 964, and other equipment and tools that are not shown for simplicity. The cable 961 may connect the surface equipment 965 with the downhole devices and tools, such as the downhole motor assembly 910. It is noted, however, that in other implementations the surface equipment 965 may include other types of surface equipment and/or additional surface equipment that are used in a downhole motor assembly system. As described above, in some implementations, the downhole motor assembly 910 may be an ESP motor assembly. The downhole motor assembly 910 of FIG. 9 may represent the downhole motor assembly 110 of FIGS. 1-6B. As described above, the downhole motor assembly 910 may include a first tubular housing 911 that may house a first section or a first portion of the downhole motor assembly 910, and a second tubular housing 912 that may house a second section or a second portion of the downhole motor assembly 910. For example, the first tubular housing 911 may be the outer housing of the downhole motor assembly 910, and the second tubular housing 912 may be the end housing of the downhole motor assembly 910. The various tubular housing sections may house various components or parts or portions of the downhole motor assembly 910, such as portions of the motor machinery and features, portions of the pump machinery and features, and other portions and features of the downhole motor assembly 910.

As described above in FIGS. 1-6B, the first tubular housing 911 and the second tubular housing 912 may be axially joined to form the joint 915, and one or more radially disposed fasteners and other attachment and securing mechanisms described above may be used to secure the joint 915 between the first and second tubular housings 911 and 912. The downhole motor assembly 910 may include one or more additional tubular housing sections. One or more of the additional adjacent tubular sections may also be joined and secured together using the fasteners and securing mechanisms described above in FIGS. 1-6B. For example, the downhole motor assembly 910 may include a third tubular housing 916. The third tubular housing 916 may be joined with the first tubular housing 911 to form the joint 917, and the joint 917 may be secured using the fasteners and securing mechanisms described above in FIGS. 1-6B. It is noted, however, that the fasteners and securing mechanisms described above can be used in any type of modular motor assemblies and devices used in well systems.

Although some example motor assemblies and well systems are described in FIGS. 1-9, it is noted, however, that the fasteners and securing mechanisms described above in FIGS. 1-9 can be used in any type of motor assembly and well system in the oil and gas industry.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc. Some implementations may perform additional operations, fewer operations, operations in parallel or in a different order, and some operations differently.

While the aspects of the disclosure are described with reference to various implementations and exploitations, it will be understood that these aspects are illustrative and that the scope of the claims is not limited to them. In general, techniques for motor housing assembly with radially disposed fasteners for well systems as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C"

is satisfied by any element from the set {A, B, C} or any combination thereof, including multiples of any element.

Furthermore, unless otherwise specified, use of the terms "up," "upper," "upward," "uphole," "upstream," or other like terms shall be construed as generally away from the bottom, terminal end of a well; likewise, use of the terms "down," "lower," "downward," "downhole," or other like terms shall be construed as generally toward the bottom, terminal end of the well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

EXAMPLE EMBODIMENTS

Example Embodiments can include the following:

Embodiment #1: A downhole motor assembly for a well system, comprising: a first tubular housing configured to house a first portion of the downhole motor assembly; a second tubular housing configured to house a second portion of the downhole motor assembly and configured to axially join with the first tubular housing; and one or more radially disposed fasteners coupled with the first tubular housing and the second tubular housing and configured to secure a joint between the first tubular housing and the second tubular housing, each of the one or more radially disposed fasteners including a threaded portion and a cylindrical portion.

Embodiment #2: The downhole motor assembly of Embodiment #1, wherein the downhole motor assembly is an electric submersible pump (ESP) motor assembly of the well system, and the one or more one or more radially disposed fasteners are one or more shoulder bolts.

Embodiment #3: The downhole motor assembly of Embodiment #1, further comprising one or more fastener retainment mechanisms, wherein each of the one or more fastener retainment mechanisms is coupled with a corresponding one of the one or more radially disposed fasteners, and each of the one or more fastener retainment mechanisms is configured to retain in place the corresponding one of the one or more radially disposed fasteners to further secure the joint between the first tubular housing and the second tubular housing.

Embodiment #4: The downhole motor assembly of Embodiment #3, wherein the one or more fastener retainment mechanisms are lock washers, thread-locking compounds, residual-torque thread profiles, or residual-torque thread inserts.

Embodiment #5: The downhole motor assembly of Embodiment #1, wherein the threaded portion of each of the one or more radially disposed fasteners is located at a bottom portion of the radially disposed fastener, and the cylindrical portion of each of the one or more radially disposed fasteners is located at a top portion of the radially disposed fastener, wherein the cylindrical portion is a cylindrical shoulder portion having a larger diameter than the threaded portion.

Embodiment #6: The downhole motor assembly of Embodiment #1, wherein the cylindrical portion of each of the one or more radially disposed fasteners is located at a bottom portion of the radially disposed fastener, and the threaded portion of each of the one or more radially disposed fasteners is located at a top portion of the radially disposed fastener, wherein the threaded portion has a larger diameter than the cylindrical portion.

Embodiment #7: The downhole motor assembly of Embodiment #1, wherein each of the one or more radially disposed fasteners include a drive feature for driving and tightening the radially disposed fastener into a corresponding milled fastener hole at the joint of the first tubular housing and the second tubular housing and for removing the radially disposed fastener when disassembling the first tubular housing and the second tubular housing.

Embodiment #8: The downhole motor assembly of Embodiment #7, wherein each of the one or more radially disposed fasteners or an area of either the first tubular housing or the second tubular housing that surrounds each of the one or more radially disposed fasteners after being inserted into the corresponding milled fastener holes includes a peened feature to further retain each of the one or more radially disposed fasteners at the joint between the first tubular housing and the second tubular housing.

Embodiment #9: The downhole motor assembly of Embodiment #1, wherein the one or more radially disposed fasteners are configured to secure the joint between the first tubular housing and the second tubular housing by constraining axial and rotational movements of the first tubular housing and the second tubular housing.

Embodiment #10: A well system, comprising: a well tubing; and a downhole motor assembly coupled with the well tubing, the downhole motor assembly including: a first tubular housing configured to house a first portion of the downhole motor assembly; a second tubular housing configured to house a second portion of the downhole motor assembly and configured to axially join with the first tubular housing; and one or more radially disposed fasteners coupled with the first tubular housing and the second tubular housing and configured to secure a joint between the first tubular housing and the second tubular housing, each of the one or more radially disposed fasteners including a threaded portion and a cylindrical portion.

Embodiment #11: The well system of Embodiment #10, wherein the downhole motor assembly is an electric submersible pump (ESP) motor assembly of the well system, and the one or more one or more radially disposed fasteners are one or more shoulder bolts.

Embodiment #12: The well system of Embodiment #10, wherein the downhole motor assembly further includes one or more fastener retainment mechanisms, wherein each of the one or more fastener retainment mechanisms is coupled with a corresponding one of the one or more radially disposed fasteners, and each of the one or more fastener retainment mechanisms is configured to retain in place the corresponding one of the one or more radially disposed fasteners to further secure the joint between the first tubular housing and the second tubular housing.

Embodiment #13: The well system of Embodiment #12, wherein the one or more fastener retainment mechanisms are lock washers, thread-locking compounds, residual-torque thread profiles, or residual-torque thread inserts.

Embodiment #14: The well system of Embodiment #10, wherein the threaded portion of each of the one or more radially disposed fasteners is located at a bottom portion of the radially disposed fastener, and the cylindrical portion of each of the one or more radially disposed fasteners is located at a top portion of the radially disposed fastener, wherein the cylindrical portion is a cylindrical shoulder portion having a larger diameter than the threaded portion.

Embodiment #15: The well system of Embodiment #10, wherein the cylindrical portion of each of the one or more radially disposed fasteners is located at a bottom portion of the radially disposed fastener, and the threaded portion of each of the one or more radially disposed fasteners is located at a top portion of the radially disposed fastener, wherein the threaded portion has a larger diameter than the cylindrical portion.

Embodiment #16: The well system of Embodiment #10, wherein each of the one or more radially disposed fasteners include a drive feature for driving and tightening the radially disposed fastener into a corresponding milled fastener hole at the joint of the first tubular housing and the second tubular housing and for removing the radially disposed fastener when disassembling the first tubular housing and the second tubular housing.

Embodiment #17: The well system of Embodiment #16, wherein each of the one or more radially disposed fasteners or an area of either the first tubular housing or the second tubular housing that surrounds each of the one or more radially disposed fasteners after being inserted into the corresponding milled fastener holes includes a peened feature to further retain each of the one or more radially disposed fasteners at the joint between the first tubular housing and the second tubular housing.

Embodiment #18: A method for using a downhole motor assembly in a well system, comprising: positioning the downhole motor assembly downhole in a wellbore of the well system, the downhole motor assembly including: a first tubular housing configured to house a first portion of the downhole motor assembly, a second tubular housing configured to house a second portion of the downhole motor assembly and configured to axially join with the first tubular housing, and one or more radially disposed fasteners coupled with the first tubular housing and the second tubular housing and configured to secure a joint between the first tubular housing and the second tubular housing, each of the one or more radially disposed fasteners including a threaded portion and a cylindrical portion; and performing one or more well operations in the wellbore using the downhole motor assembly.

Embodiment #19: The method of Embodiment #18, wherein the threaded portion of each of the one or more radially disposed fasteners is located at a bottom portion of the radially disposed fastener, and the cylindrical portion of each of the one or more radially disposed fasteners is located at a top portion of the radially disposed fastener, wherein the cylindrical portion is a cylindrical shoulder portion having a larger diameter than the threaded portion.

Embodiment #20: The method of Embodiment #18, wherein the cylindrical portion of each of the one or more radially disposed fasteners is located at a bottom portion of the radially disposed fastener, and the threaded portion of each of the one or more radially disposed fasteners is located at a top portion of the radially disposed fastener, wherein the threaded portion has a larger diameter than the cylindrical portion.

What is claimed is:

1. A downhole motor assembly for a well system, comprising:
   a first tubular housing configured to directly house a first portion of the downhole motor assembly;
   a second tubular housing configured to directly house a second portion of the downhole motor assembly and configured to axially join with the first tubular housing; and one or more radially disposed fasteners coupled with the first tubular housing and the second tubular housing and configured to secure a joint between the first tubular housing and the second tubular housing, each of the one or more radially disposed fasteners including a threaded portion and a cylindrical portion.

2. The downhole motor assembly of claim 1, wherein the downhole motor assembly is an electric submersible pump (ESP) motor assembly of the well system, and the one or more one or more radially disposed fasteners are one or more shoulder bolts.

3. The downhole motor assembly of claim 1, further comprising one or more fastener retainment mechanisms, wherein each of the one or more fastener retainment mechanisms is coupled with a corresponding one of the one or more radially disposed fasteners, and each of the one or more fastener retainment mechanisms is configured to retain in place the corresponding one of the one or more radially disposed fasteners to further secure the joint between the first tubular housing and the second tubular housing.

4. The downhole motor assembly of claim 1, further comprising one or more lock washers, wherein the one or more radially disposed fasteners are one or more shoulder bolts, wherein each of the one or more lock washers is coupled with a corresponding one of the one or more shoulder bolts.

5. The downhole motor assembly of claim 1, wherein the threaded portion of each of the one or more radially disposed fasteners is located at a bottom portion of the radially disposed fastener, and the cylindrical portion of each of the one or more radially disposed fasteners is located at a top portion of the radially disposed fastener, wherein the cylindrical portion is a cylindrical shoulder portion having a larger diameter than the threaded portion.

6. The downhole motor assembly of claim 1, wherein the cylindrical portion of each of the one or more radially disposed fasteners is located at a bottom portion of the radially disposed fastener, and the threaded portion of each of the one or more radially disposed fasteners is located at a top portion of the radially disposed fastener, wherein the threaded portion has a larger diameter than the cylindrical portion.

7. The downhole motor assembly of claim 1, wherein each of the one or more radially disposed fasteners include a drive feature for driving and tightening the radially disposed fastener into a corresponding milled fastener hole at the joint of the first tubular housing and the second tubular housing and for removing the radially disposed fastener when disassembling the first tubular housing and the second tubular housing.

8. The downhole motor assembly of claim 7, wherein each of the one or more radially disposed fasteners or an area of either the first tubular housing or the second tubular housing that surrounds each of the one or more radially disposed fasteners after being inserted into the corresponding milled fastener holes includes a peened feature to further retain each of the one or more radially disposed fasteners at the joint between the first tubular housing and the second tubular housing.

9. The downhole motor assembly of claim 1, wherein the one or more radially disposed fasteners are configured to secure the joint between the first tubular housing and the second tubular housing by constraining axial and rotational movements of the first tubular housing and the second tubular housing.

10. A well system, comprising:
    a well tubing; and a downhole motor assembly coupled with the well tubing, the downhole motor assembly including:
    a first tubular housing configured to directly house a first portion of the downhole motor assembly;
    a second tubular housing configured to directly house a second portion of the downhole motor assembly and configured to axially join with the first tubular housing; and
    one or more radially disposed fasteners coupled with the first tubular housing and the second tubular housing and configured to secure a joint between the first tubular housing and the second tubular housing, each of the one or more radially disposed fasteners including a threaded portion and a cylindrical portion.

11. The well system of claim 10, wherein the downhole motor assembly is an electric submersible pump (ESP) motor assembly of the well system, and the one or more one or more radially disposed fasteners are one or more shoulder bolts.

12. The well system of claim 10, wherein the downhole motor assembly further includes one or more fastener retainment mechanisms, wherein each of the one or more fastener retainment mechanisms is coupled with a corresponding one of the one or more radially disposed fasteners, and each of the one or more fastener retainment mechanisms is configured to retain in place the corresponding one of the one or more radially disposed fasteners to further secure the joint between the first tubular housing and the second tubular housing.

13. The well system of claim 10, further comprising one or more lock washers, wherein the one or more radially disposed fasteners are one or more shoulder bolts, wherein each of the one or more lock washers is coupled with a corresponding one of the one or more shoulder bolts.

14. The well system of claim 10, wherein the threaded portion of each of the one or more radially disposed fasteners is located at a bottom portion of the radially disposed fastener, and the cylindrical portion of each of the one or more radially disposed fasteners is located at a top portion of the radially disposed fastener, wherein the cylindrical portion is a cylindrical shoulder portion having a larger diameter than the threaded portion.

15. The well system of claim 10, wherein the cylindrical portion of each of the one or more radially disposed fasteners is located at a bottom portion of the radially disposed fastener, and the threaded portion of each of the one or more radially disposed fasteners is located at a top portion of the radially disposed fastener, wherein the threaded portion has a larger diameter than the cylindrical portion.

16. The well system of claim 10, wherein each of the one or more radially disposed fasteners include a drive feature for driving and tightening the radially disposed fastener into a corresponding milled fastener hole at the joint of the first tubular housing and the second tubular housing and for removing the radially disposed fastener when disassembling the first tubular housing and the second tubular housing.

17. The well system of claim 16, wherein each of the one or more radially disposed fasteners or an area of either the first tubular housing or the second tubular housing that surrounds each of the one or more radially disposed fasteners after being inserted into the corresponding milled fastener holes includes a peened feature to further retain each of the one or more radially disposed fasteners at the joint between the first tubular housing and the second tubular housing.

18. A method for using a downhole motor assembly in a well system, comprising:

positioning the downhole motor assembly downhole in a wellbore of the well system, the downhole motor assembly including:

a first tubular housing configured to directly house a first portion of the downhole motor assembly, a second tubular housing configured to directly house a second portion of the downhole motor assembly and configured to axially join with the first tubular housing, and one or more radially disposed fasteners coupled with the first tubular housing and the second tubular housing and configured to secure a joint between the first tubular housing and the second tubular housing, each of the one or more radially disposed fasteners including a threaded portion and a cylindrical portion; and performing one or more well operations in the wellbore using the downhole motor assembly.

19. The method of claim 18, wherein the threaded portion of each of the one or more radially disposed fasteners is located at a bottom portion of the radially disposed fastener, and the cylindrical portion of each of the one or more radially disposed fasteners is located at a top portion of the radially disposed fastener, wherein the cylindrical portion is a cylindrical shoulder portion having a larger diameter than the threaded portion.

20. The method of claim 18, wherein the cylindrical portion of each of the one or more radially disposed fasteners is located at a bottom portion of the radially disposed fastener, and the threaded portion of each of the one or more radially disposed fasteners is located at a top portion of the radially disposed fastener, wherein the threaded portion has a larger diameter than the cylindrical portion.

* * * * *